(12) United States Patent
Mantock

(10) Patent No.: US 8,787,000 B2
(45) Date of Patent: Jul. 22, 2014

(54) INTERACTIVE ELECTROSTATIC FIELD HIGH ENERGY STORAGE AC BLOCKING CAPACITOR

(76) Inventor: Paul Lenworth Mantock, Middlesex (GB)

( * ) Notice: Subject to any disclaimer, the term of this patent is extended or adjusted under 35 U.S.C. 154(b) by 123 days.

(21) Appl. No.: 13/583,231

(22) PCT Filed: Mar. 7, 2011

(86) PCT No.: PCT/GB2011/000320
§ 371 (c)(1),
(2), (4) Date: Sep. 7, 2012

(87) PCT Pub. No.: WO2011/110805
PCT Pub. Date: Sep. 5, 2011

(65) Prior Publication Data
US 2012/0327552 A1  Dec. 27, 2012

(30) Foreign Application Priority Data
Mar. 8, 2010 (GB) .................................. 1003808.1

(51) Int. Cl.
*H01G 4/005* (2006.01)
*H01G 9/00* (2006.01)

(52) U.S. Cl.
USPC .............................. 361/303; 361/502; 361/508

(58) Field of Classification Search
None
See application file for complete search history.

(56) References Cited

U.S. PATENT DOCUMENTS 3,090,895 A * 5/1963 Hall ................................ 361/303
5,359,487 A * 10/1994 Carrico et al. ............. 361/301.5
7,782,595 B2 * 8/2010 Mantock ........................ 361/512

* cited by examiner

*Primary Examiner* — Jayprakash N Gandhi
*Assistant Examiner* — Dion R Ferguson

(57) ABSTRACT

A interactive electrostatic field high energy storage AC blocking capacitor in which a first a first embodiment of the invention comprises a charging plate in the form of an active interactive electrostatic field charging plate 10 being formed from electric conducting material into a three longitudinal parallel partially separated sectioned closed continuous electrical loop, comprising a mid-section 12 and two outer sections 13 and 14, one at each side of the mid-section. The charging plate in the form of an active interactive electrostatic field charging plate 10 is capacitively coupled to a negative plate 27 by a dielectric material 22 and the negative plate 27 is provided with a connector 15 for connection to an electric circuit. The mid-section 12 is provided with a connector 15 as means to connect it to a source of a charge and the two outer sections 13 and 14 being electrically connected at 16 and 17 to the mid-section 12 is such a way so they have opposing charging current flow. When the active electrostatic field reversing charging plate is charged, the charging current flows around the mid-section 12 of the active interactive electrostatic field charging plate 10 charging it, creating an electrostatic field, which is concentrated along its outer edges. The same charging current then flows in the opposite direction around the two outer sections 13 and 14 charging them and creating an opposing concentrated electrostatic field along their outer edges. This ensures that the charge is evenly distributed in the dielectric material 22 around the active interactive electrostatic field charging plate by which the interactive electrostatic field charging plate 10 is capacitively coupled to the negative plate 27. Eliminating all localized electrostatic field concentrations, increasing the voltage at which it can be charged, thereby increasing electric energy storage capacity and being able to block AC current.

7 Claims, 2 Drawing Sheets

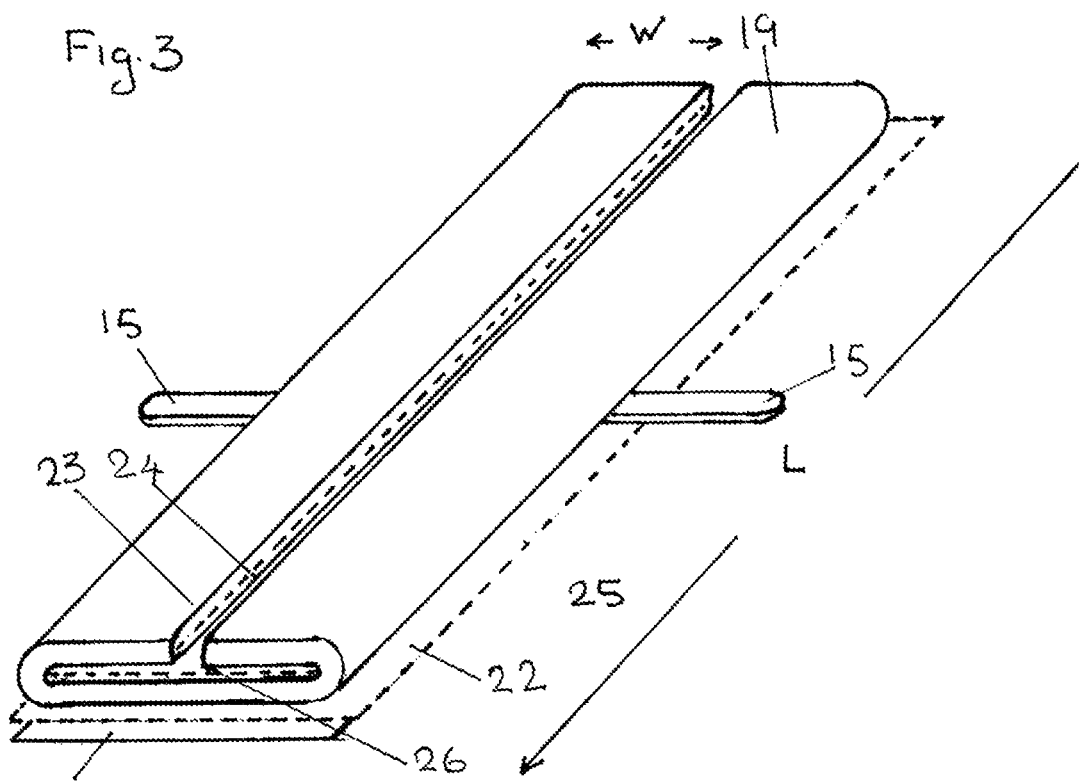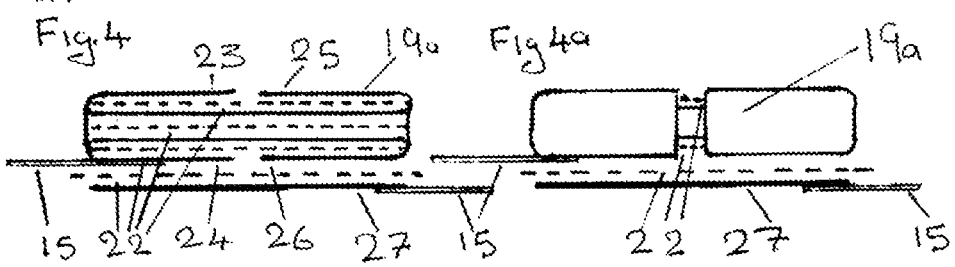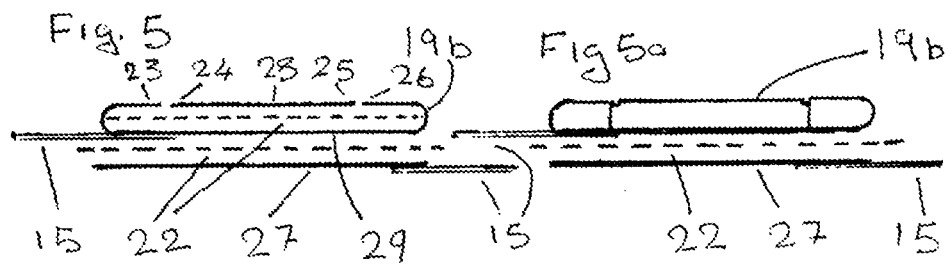

INTERACTIVE ELECTROSTATIC FIELD HIGH ENERGY STORAGE AC BLOCKING CAPACITOR

CROSS-REFERENCE RELATED APPLICATION

This application claims priority date of Patent Application No. 1003808.1 (GB) filed 2010 Mar. 3 by the present inventor.

FEDERALLY SPONSORED RESEARCH

NOT APPLICABLE

SEQUENCE LISTING OR PROGRAM

NOT APPLICABLE

BACKGROUND OF INVENTION

Field of Invention

All capacitors stores electric energy E joules according to following relationship;

$E=CV^2/2$ joules, where C is capacitance and $C=KKoA/d$ farads

It is well known, based on the above energy equation, that if the voltage V volts at which the capacitor is charged can be increased sufficiently, capacitors could potentially have a charge density of that greater than batteries and being able to be recharged at a fraction of the time it takes to charge a battery, it would surpass batteries as a high density electric energy storage device. The increase of capacitance of a capacitor can be achieved by a dielectric material with a sufficiently high dielectric constant, and or increase the surface area of the charging plate and or reducing the thickness of the dielectric material separating the plates. The problem is that when the capacitance of the capacitor is increased, by any of these means, current capacitor designs causes electrostatic field concentrations, which increases the potential difference at these points between the positive and negative plates, apparently weakening the dielectric strength of the dielectric material. This has the effect of causing the voltage at which it can be charged to be reduced, to ensure that dielectric breakdown is prevented, thereby reducing the amount of energy that can be stored. This is because all capacitors depend on the dielectric strength of the dielectric material separating the plates and conventional capacitors when charged, concentrates the electrostatic charge at the ends of the plate, causing uneven electrostatic charge distribution over the capacitor plate. The buffer capacitor as defined in U.S. Pat. No. 7,782,595, with its closed continuous electric loop plate design, eliminates the plate ends, completely eliminating plate end electrostatic field concentrations, distributing the electrostatic field evenly over the plate, but evenly distributing the electrostatic field concentration along the plate edges instead. Hence the plate design of both the conventional buffer capacitors concentrates the electrostatic field. It is well known that when an electric current flows through an electric conducting material, produces an electric field and when an electric field cuts an electric conducting material it produces and electric current. When a capacitor is charged by an electric current it creates an electrostatic field, which has the same characteristics as an electric field. When the electrostatic field concentrates either at the ends or the edges of the charging capacitor plate the voltage at these points of concentrations increases, over and above the voltage at which the capacitor is charged. This is because as the electrostatic field concentration increases, its energy increases and as its energy increases the potential difference between the positively charged and negative plates at the points of electrostatic field concentrations. In addition an electrostatic field is attracted to sharp points or edges and it is to these points or edges that the points or edges of localized electrostatic field concentrations are attracted, having the effect of further increasing the potential difference of the localized electrostatic field concentrations between the positive and negative plates. And when the capacitor is charged this increased potential difference causes it to reach the breakdown potential difference voltage of the dielectric material separating the charging and negative plates. This causes the breakdown the dielectric material, causing the charge to be discharge to the negative plate of the capacitor as an electric current at a low charging voltage, thereby limiting the voltage at which a capacitor can store electric energy. The situation is exacerbated when the storage capacity of the capacitor is increased by increasing the dielectric constant in high energy storage capacitors. It is perhaps the reason why the dielectric will breakdown at a lower AC voltage than DC voltage because it's peaked characteristic enhances electrostatic field concentrations, enabling capacitors to transmit an AC current. By eliminating these points of electrostatic field concentrations by controlling the electrostatic field to eliminate and reduce the effects of points and edges of electrostatic field attraction, AC currents can be blocked and capacitors of higher charging voltages, hence higher energy storage can be achieved.

The present invention is an interactive electrostatic field high energy storage AC blocking capacitor in which a first a first embodiment of the invention comprises a charging plate in the form of an active interactive electrostatic field charging plate being formed from electric conducting material into a three longitudinal parallel partially separated sectioned closed continuous electrical loop, comprising a mid-section and two outer sections, one at each side of the mid-section. The charging plate in the form of an active interactive electrostatic field charging plate is capacitively coupled to a negative plate by a dielectric material and the negative plate is provided with a connector for connection to an electric circuit. The mid-section is provided with a connector as means to connect it to a power source and the two outer section being electrically connected to the mid-section is such a way as to have charging current flowing in the opposite direction to the mid-section. When the active interactive electrostatic field charging plate is charged, the charging current flows around the mid-section of the charging plate charging it, creating an electrostatic field, which is concentrated along its outer edges. The same charging current then flows in the opposite direction around the two outer sections charging them and creating an opposing concentrated electrostatic field along their outer edges.

A second embodiment of the invention is a charging plate in the form of a passive interactive electrostatic field charging plate comprising an electric conducting material being formed into three longitudinal parallel sectioned closed continuous electrical loop, comprising, mid-section and two outer sections, one at each side of the mid-section. The charging plate in the form of a passive interactive electrostatic field charging plate is capacitively coupled to a negative plate by a dielectric material and the negative plate is provided with a connector for connection to electric circuit. The mid-section is provided with a connector as means to connect it to a power source and the two outer sections, being the passive reversing sections, are not electrically connected to the mid-section.

When the active interactive electrostatic field charging plate is charged, the charging current flows around the mid-section of the charging plate charging it, creating an electrostatic field, which is concentrated along its outer edges. The concentrated electrostatic field along the outer edges of the mid-section of the passive interactive electrostatic field charging plate induces an opposing charging current in the electrically unconnected two outer sections of the passive interactive electrostatic field charging plate, charging them, creating an opposing electrostatic field in the two outer-sections of the passive interactive electrostatic field charging plate.

A third embodiment comprises a charging plate in the form of a double edged longitudinally folded interactive electrostatic field charging plate bring formed from a closed continuous electrical loop. Whereby each of the two edges from each side of the closed continuous electrical loop with sufficient widths of the electric conducting material forming the closed continuous electrical loop are folded along the length of the closed continuous electrical loop towards each other and against the electric conducting material from which it is folded and is separated electrically from the electric conducting material from which it is folded by a dielectric material. Ensuring that the double edge of the electric conducting material from the same side of the closed continuous electrical loop are folded towards each other in the same plane, without making electric contact so that the electrostatic field of each edge can interact with each other. The charging plate in the form of a double edge interactive electrostatic field charging plate is capacitively coupled to a negative plate by a dielectric material and the charging plate is provided with a connector for connection to a power supply and the negative plate is provided with a connection for connection to an electric circuit.

A forth embodiment of the invention comprises the charging plate in the form of a single edged folded interactive electrostatic field charging plate being formed from a closed continuous electrical loop. Whereby, the ends on each side of the closed continuous loop are cut to sufficient widths of electric conducting material and each edge of the two opposing edges of each the two sides of the closed continuous electrical loop are folded away from each other. And the opposing widths of electric conducting material on the same side of the closed continuous loop are folded towards each other and against the electric conducting material from which it is folded and is separated electrically from the electric conducting material from which it is folded by a dielectric material. Ensuring that edges of the electric conducting material from the same side of the closed continuous electrical loop are folded towards each other in the same plane, without making electric contact so that the electrostatic field of each edge can interact with each other. The cut widths at the ends of the folded part of the electric conducting material are electrically connected along the width of the cuts to ensure that there can be no electrostatic field concentrations. The charging plate in the form of a single edge interactive electrostatic field charging plate is capacitively coupled to a negative plate by a dielectric material and the charging plate is provided with a connector for connection to a power supply and the negative plate is provided with a connection for connection to an electric circuit.

The configurations of the charging plate into an active interactive electrostatic field charging plate, a passive interactive electrostatic field charging plate, a double edge folded interactive electrostatic field charging plate and a single edge folded interactive electrostatic field plate, each formed from a closed continuous electrical loop, forming the first, second, third and fourth embodiments of the invention respectively, being each capacitively coupled by a dielectric material to a negative plate. And when the charging plate of each embodiment is charge the charge will cause the electrostatic field concentrated at the edges of each configuration of the closed continuous electrical loop to interact with each other by repulsion, and in doing so, neutralize each other eliminating electrostatic field concentrations, causing the electrostatic field to be evenly distributed around the charging plate, within the dielectric material. The electrostatic field concentrations being evenly distributed around the charging plate within the dielectric material, prevents any localized increased potential difference between the charging and negative plates so that the charging plate will have a uniform potential difference distribute over its surface at the same or almost the same value of the voltage of the power supply. And the evenly distributed opposing electrostatic fields, in opposing each other, prevents each opposing electrostatic field from being induced into the negative plate through the capacitive coupling dielectric material that would cause current flow in the negative plate, blocking an AC current irrespective of the voltage, providing the charging and negative capacitively coupled plates are secured together with sufficient force. This enables the interactive electrostatic field high energy storage AC blocking capacitor to be charged at a higher voltage than would otherwise be possible with points of electrostatic field concentrations, by having the effect of dramatically increasing the breakdown voltage of the dielectric material coupling the charging and negative plates, so that charging voltage can be dramatically increased, thereby increasing the energy storage capacity of the interactive electrostatic field high energy storage AC blocking capacitor.

A fifth embodiment of the invention comprises a charging plate in the form of an parallel edge folded interactive electrostatic field charging plate comprising a closed continuous electrical loop whose pair of opposing edges of the same side of each side of the closed continuous electrical loop being configured so that they are be folded towards each other. This is achieved by one side of the closed continuous electric loop having its surface area reduced by reducing its width, both sides, along the length of the closed continuous electrical loop. The width of both sides of the other side is increase by almost the same amount that the opposing side is reduced, thereby increasing its surface area, both sides, along the length of the closed continuous electrical loop, by almost the same amount by which the surface area of the other side is reduced. The side of the closed continuous electrical loop with the increased width is folded around the dielectric material separating both sides of the closed continuous electrical loop, along its length, towards the side with the reduce width without being in electric contact with each other. The parallel edge folded interactive electrostatic field charging plate is provided with a connector for connection to a power source and is capacitively coupled to a negative plate by a dielectric material. The negative plate is provided with a connector for connection to an electric circuit. When the parallel edge folded interactive electrostatic field charging plate is charged the charging current will create opposing electrostatic fields at the opposing folded edges of the closed continuous electrical loop that will interact which each other by attraction causing even electrostatic field distribution in the dielectric material, eliminating or reducing dramatically charge concentrations. Having the effect of increasing dramatically the breakdown voltage of the dielectric material between the charging and negative plates, blocking AC current, hence the interactive electrostatic field high energy device can be charge at high voltage, increasing its energy capacity.

The five embodiments of the charging plates are enclosed longitudinally (not shown) by an electric conducting material forming the negative plate of the interactive electrostatic field high energy storage AC blocking capacitor. It is capacitively coupled to the charging plate by a dielectric material and it is provided with a connector as means to connect the negative plate to an electric circuit. This enclosed arrangement of the electric conducting material forming the negative plate is configured in such a way to ensure its edges are remote from the edges of the charging plate, ensuring that all paths for any residual charge concentrations on the charging plate to the negative plate are eliminated. This should have the effect of increasing, even more, the charging voltage of the interactive electrostatic field high energy storage AC blocking capacitor.

The invention shall be described with the use of the following drawings.

FIG. 3 shows a perspective view of the third embodiment of the invention

FIG. 4 shows a sectioned view of the fourth embodiment of the invention

FIG. 4a shows an end view of the forth embodiment of the invention

FIG. 5 shows a sectioned view of the fifth embodiment of the invention

FIG. 5a shows an end view of the fifth embodiment of the invention

Figure 1:
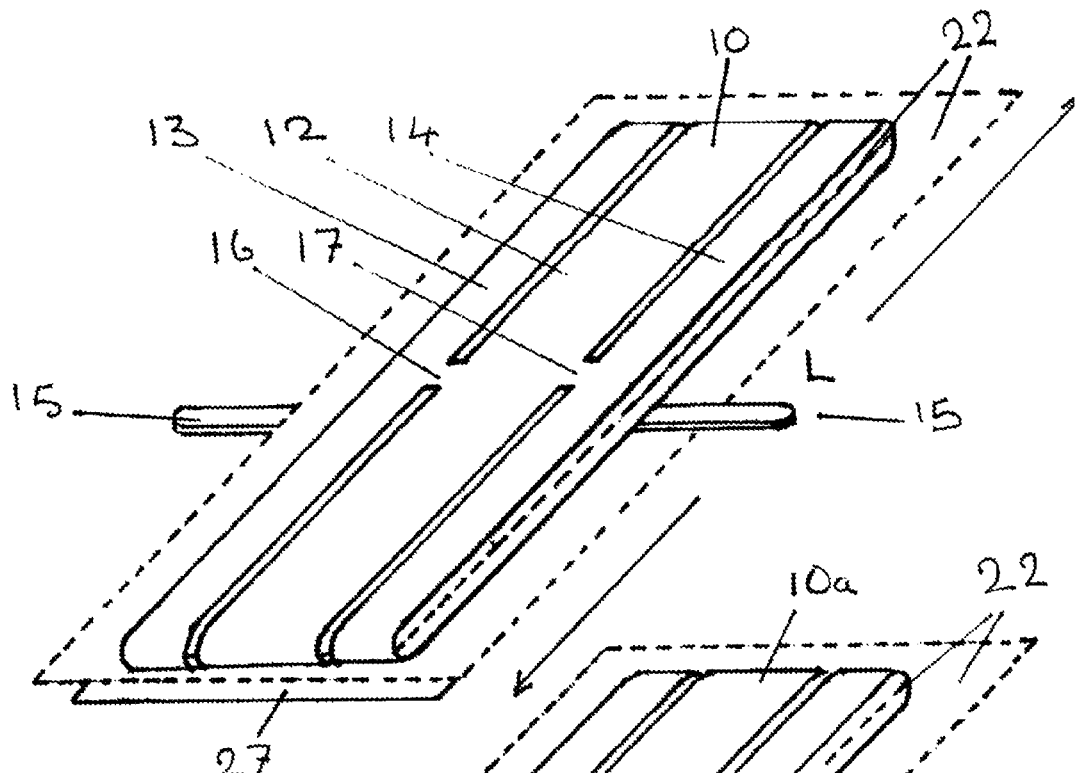
FIG. 1 shows a perspective view of the first embodiment of the invention.

From the drawings FIG. 1 the interactive electrostatic field high energy storage capacitor in which a first a first embodiment of the invention comprises a charging plate in the form of an active interactive electrostatic field charging plate 10 being formed from electric conducting material into a three longitudinal parallel partially separated sectioned closed continuous electrical loop, comprising a mid-section 12 and two outer sections 13 and 14, one at each side of the mid-section 12. The charging plate in the form of an active interactive electrostatic field charging plate 10 is capacitively coupled to a negative plate 27 by a dielectric material 22 and the negative plate 27 is provided with a connector 15 for connection to an electric circuit. The mid-section 12 is provided with a connector 15, which is electrically insulated from the outer sections 13 and 14, as means to connect it to a power source and the two outer sections 13 and 14 being electrically connected at 16 and 17 to the mid-section 12 is such a way so they have opposing charging current flow. When the active electrostatic field reversing charging plate is charged, the charging current flows around the mid-section 12 of the active interactive electrostatic field charging plate 10 charging it, creating an electrostatic field, which is concentrated along its outer edges. The same charging current then flows in the opposite direction around the two outer sections 13 and 14 charging them and creating an opposing concentrated electrostatic field along their outer edges.

Figure 2:
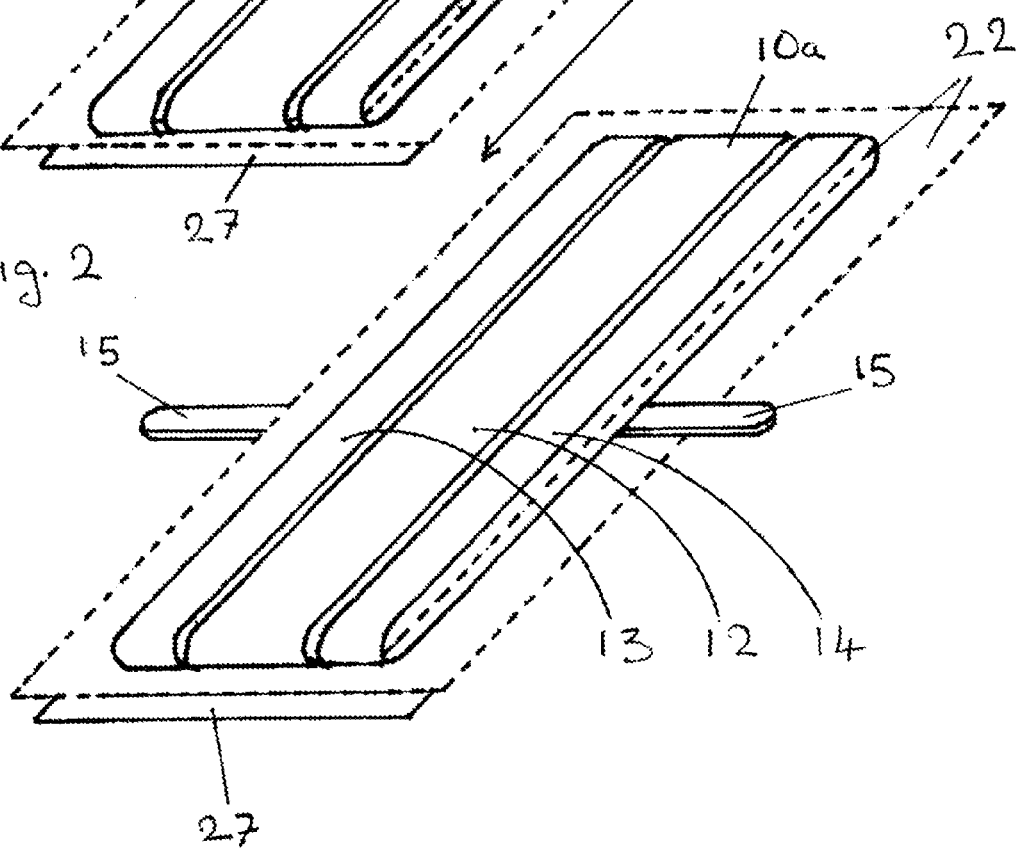
FIG. 2 shows a perspective view of the second embodiment of the invention.

From drawings FIG. 2 a second embodiment of the invention is a charging plate in the form of a passive interactive electrostatic field charging plate 10a comprising an electric conducting material being formed into three longitudinal parallel sectioned closed continuous electrical loop, comprising, mid-section 12 and two outer sections 13 and 14, one at each side of the mid-section 12. The charging plate in the form of an active interactive electrostatic field charging plate 10a is capacitively coupled to a negative plate 27 by a dielectric material 22 and the negative plate 27 is provided with a connector 15 for connection to an electric circuit. The mid-section 12 is provided with a connector 15, which is electrically insulated from the outer sections 13 and 14 as means to connect it to a power source and the two outer section 13 and 14, being the passive reversing sections, are not electrically connected. When passive interactive electrostatic field charging plate 10a is charged the charging current flows around the mid-section 12 of the passive interactive electrostatic field charging plate 10a charging it, creating an electrostatic field, which is concentrated along its outer edges. The concentrated electrostatic field along the outer edges of the mid-section 12 of the passive interactive electrostatic field charging plate 10a, induces an opposing charging current in the two outer sections 13 and 14 of the passive interactive electrostatic field charging plate, charging them, creating an opposing electrostatic field in the two outer-sections 13 and 14 of the passive interactive electrostatic field charging plate 10a which are concentrated at the edges of the mid-section 12 and the outer sections 13 and 14.

A third embodiment of the invention as in FIG. 3 comprises a charging plate in the form of a double edged folded interactive electrostatic field charging plate 19 being formed from a closed continuous electrical loop. Whereby each of the two paired edges 23, 24 and 25, 26 from each side of the closed continuous electrical loop with sufficient widths of the electric conducting material forming the closed continuous electrical loop are folded along the length of the closed continuous electrical loop towards each other and against the electric conducting material from which it is folded and is separated electrically from the electric conducting material from which it is folded by a dielectric material 22. Ensuring that each of the two edges 23, 24 and 25, 26 of the electric conducting material from the same side of the closed continuous electrical loop are folded towards each other in the same plane, without making electric contact so that the electrostatic field of each of the two edges 23, 24 and 25,26 can interact with each other. The double edge folded interactive electrostatic field charging plate 19 is provided with a connector 15 for connection to power source and is capacitively coupled to a negative plate 27 by a dielectric material 22. The negative plate 27 is provided with a connector 15 for connection to an electric circuit. When the charging plate in the form of a double edge folded interactive electrostatic field charging plate 19 is charged the charge concentrate at the two paired edges 23, 24 and 25, 26.

A forth embodiment of the invention, as in FIG. 4, comprises the charging plate in the form of a single edge folded interactive electrostatic field charging plate 19a being formed from a closed continuous electrical loop. Whereby, the ends on each side of the closed continuous loop are cut to sufficient widths of electric conducting material and each edge 23, 24 and 25 and 26 of the two opposing edges of each the two sides of the closed continuous electrical loop are folded away from each other. And the opposing widths of electric conducting material on the same side of the closed continuous loop are folded towards each other and against the electric conducting material from which it is folded and is separated electrically from the electric conducting material from which it is folded by a dielectric material. Ensuring that edges 23, 24 and 25, 26 of the electric conducting material from the same side of the closed continuous electrical loop are folded towards each other in the same plane, without making electric contact so that the electrostatic field of each edge 23, 25 can and 24, 26 interact with each other. The cut widths at the ends of the folded part of the electric conducting material are electrically connected along the width of the cuts to ensure that there can be no electrostatic field concentrations as in FIG. 4a. The single edge folded interactive electrostatic field charging plate 19a is provided with a connector 15 for connection to a power source and is capacitively coupled to a negative plate 27 by a dielectric material 22.

The negative plate 27 is provided with a connector 15 for connection to an electric circuit. When the charging plate in the form of the single edge folded interactive electrostatic field charging plate 19a is charged the charge concentrate at the two opposing edges 23, 25 and 24, 26.

The configurations of the charging plate into an active interactive electrostatic field charging plate 10, a passive interactive electrostatic field charging plate 10a, a double edge folded interactive electrostatic field charging plate 19 and a single edge folded interactive electrostatic field plate 19a, each formed from a closed continuous electrical loop, forming the first, second, third and fourth embodiments of the invention respectively are each capacitively coupled by a dielectric material 22 to a negative plate 27. And when the charging plate of each embodiment is charge the charge will cause the electrostatic field concentrated at the edges of each configuration of closed continuous electrical loop to interact with each other by repulsion, and in doing so, neutralize each other eliminating electrostatic field concentrations, causing the electrostatic field to be evenly distributed around each embodiment the charging plate, within the dielectric material 22. The electrostatic field concentrations being evenly distributed around each embodiment of the charging plate within the dielectric material 22, prevents any localized increased potential difference between the charging plate and negative plate 27 so that the charging plate will have a uniform potential difference distribute over its surface at the same or almost the same value of the voltage of the power supply. And the evenly distributed opposing electrostatic fields, in opposing each other, prevents each opposing electrostatic field from being induced into the negative plate 27 through the capacitive coupling dielectric material 22 that would cause current flow in the negative plate 27, blocking an AC current irrespective of the voltage, providing the capacitively coupled charging plate and negative plate 27 are secured together with sufficient force. This enables the interactive electrostatic field high energy storage AC blocking capacitor to be charged at a higher voltage than would otherwise be possible with points of electrostatic field concentrations, by having the effect of dramatically increasing the breakdown voltage of the dielectric material 22 coupling the charging plate and the negative plate 27, so that charging voltage can be dramatically increased, thereby increasing the energy storage capacity of the interactive electrostatic field high energy storage AC blocking capacitor.

A fifth embodiment of the invention as in FIG. 5 and FIG. 5a comprises a charging plate in the form of an parallel edge folded interactive electrostatic field charging plate 19b comprising a closed continuous electrical loop whose pair of opposing edges 23 and 24 and 25 and 26 of the same side of each side of the closed continuous electrical loop being configured so that they are be folded towards each other. This achieved by one side 28 of the closed continuous electric loop having its surface area reduced by reducing its width, both sides, along the length of the closed continuous electrical loop. The width of both sides of the other side 29 is increase by almost the same amount the opposing side is reduced, thereby increasing its surface area, both sides, along the length of the closed continuous electrical loop, by almost the same amount by which the surface area of the other side is reduced. The side 29 of the closed continuous electrical loop with the increased width is folded around the dielectric material 22 separating both sides 28 and 29 of the closed continuous electrical loop, along its length, towards the side 28 with the reduce width without being in electric contact with each other. The cuts at each end of the closed continuous electrical loop to form the reduce side 28 to increase side 29 are electrically connected along its cut length as in FIG. 5a to eliminate charge concentrations. The parallel edge folded interactive electrostatic field charging plate 19b is provided with a connector 15 for connection to a power source and is capacitively coupled to a negative plate 27 by a dielectric material 22. The negative plate 27 is provided with a connector 15 for connection to an electric circuit. When the parallel edge longitudinally folded interactive electrostatic field charging plate 19b is charged the charging current flowing in opposing directions will create opposing electrostatic fields at the opposing folded edges 24 and 25 and 25 and 26 of the closed continuous electrical loop that will interact which each other by attraction causing even electrostatic field distribution in the dielectric material 22, eliminating or reducing dramatically charge concentrations. Having the effect of increasing dramatically the apparent breakdown voltage of the dielectric material 22 between the charging plate and negative plate 27, blocking AC current, thereby the interactive electrostatic field high energy device can be charge at high voltage, increasing its energy storage capacity.

The five embodiments of the charging plates are enclosed longitudinally (not shown) by an electric conducting material forming the negative plate 27 of the interactive electrostatic field high energy storage device. It is capacitively coupled to the charging plate by a dielectric material 22 and it is provided with a connector 15 as means to connect the negative plate 27 to an electric circuit. This enclosed arrangement of the electric conducting material forming the negative plate 27 is configured in such a way to ensure its edges are remote from the edges of the charging plate, ensuring that all paths for any residual charge concentrations on the charging plate to the negative plate 27 are eliminated. This should have the effect of further increasing the breakdown voltage of the dielectric material, charging voltage of the interactive electrostatic field high energy storage AC blocking capacitor, further increasing its energy storage capacity

The invention claimed is:

1. An interactive electrostatic field high energy storage AC blocking capacitor comprising;
    at least one charging plate in the form of an active interactive electrostatic field charging plate and the active interactive electrostatic field charging being formed from electric conducting material into a plurality of longitudinal parallel partially separated sectioned closed continuous electrical loops
    and one of the plurality of longitudinal parallel partially separated sectioned closed continuous electrical loop is provided with at least one connector as means to connect it to a power source
    and the charging plate in the form of an active interactive electrostatic field charging plate is provided at least one negative plate capacitively coupled to the active interactive field charging plate and the at least one negative plate provided with at least one connector as means to for connection to an electric circuit
    and the plurality of longitudinal parallel partially separated sectioned closed continuous electrical loop sections being electrically connected to each other is such a way so that when the active interactive electrostatic field charging plate is connected to a power source and charged,
    the charging current will flow in the opposite directions to each other, creating opposing electrostatic fields in the plurality of longitudinal parallel partially separated closed continuous electrical loop sections, ensuring that when the charging plate in the form of an active interactive electrostatic field charging plate is charged the opposing electrostatic fields in the plurality of longitudinal parallel partially separated closed continuous electrical loop sections interact with each other and neutralize each other eliminating, electrostatic field concentrations, causing the electrostatic field to be evenly distributed around the charging plate in the form of an active interactive electrostatic field charging plate, within the dielectric material, preventing each opposing electrostatic field from being induced into the negative plate through the separating dielectric material, enabling an increase of the charging voltage, thereby increasing the energy storage capacity and blocking AC current.

2. An interactive electrostatic field high energy storage AC blocking capacitor comprising;

at least one charging plate in the form of a passive interactive electrostatic field charging plate and the passive interactive electrostatic field plate being formed from electric conducting material into a plurality of longitudinal parallel separate sectioned closed continuous electrical loop and one of the plurality of longitudinal parallel separated sectioned closed continuous electrical loop is provided with at least one connector as means to connect it to a power source and the passive interactive electrostatic field charging plate is provided at least one negative plate capacitively couple to the passive interactive field charging plate and the at least one negative plate provided with at least one connector as means to for connection to an electric circuit and the plurality of longitudinal parallel separated sectioned closed continuous electrical loop sections being electrically separate from each other and when charging current flowing in electrically connected closed continuous electrical loop section the generated electrostatic field will be induced into the unconnected closed continuous loop section, creating opposing electrostatic fields in the plurality of longitudinal parallel partially separated closed continuous electrical loops, ensuring that when the passive interactive electrostatic field charging plate is charged the opposing electrostatic fields in the plurality of longitudinal parallel separated closed continuous electrical loops interact with each other and neutralize each other, eliminating electrostatic field concentrations, causing the electrostatic field to be evenly distributed around the passive interactive electrostatic field charging plate, within the dielectric material, preventing each opposing electrostatic field from being induced into the negative plate through the separating dielectric material, enabling an increase of the charging voltage, thereby increasing the energy storage capacity and blocking AC current.

3. An interactive electrostatic field high energy storage AC blocking capacitor comprising;

at least one charging plate in the form of a folded edge interactive electrostatic field plate being formed from a closed continuous electrical loop whereby the edges along the length of the closed continuous electrical loop are folded and being in opposition with each other and the folded edge interactive electrostatic field charging plate is provided with at least one connector as means to connect the folded edge interactive field charging plate to a power source and the charging plate in the form of an edge interactive electrostatic field charging plate is provided at least one negative plate capacitively couple by a dielectric material to the edge interactive field charging plate and the negative plate provided with at least one connector as means to for connection to an electric circuit and when the charging plate is charged the concentrated electrostatic field at the folded edges of the closed continuous electrical loop will be in opposition to each other, interacting with each other, neutralize each other eliminating, electrostatic field concentrations, causing the electrostatic field to be evenly distributed around the charging plate, within the dielectric material of the capacitively coupling dielectric material and preventing each opposing electrostatic field from being induced into the negative plate through the capacitive coupling dielectric material enabling an increase of the charging voltage, thereby increasing the energy storage capacity and blocking AC current.

4. An interactive electrostatic field High energy storage AC blocking capacitor as in claim 1 wherein;

the at least one plate and said plate is configured in such a way so that a current flows in opposing directions and the said current flows in opposing directions generates opposing electrostatic fields and is the means by which opposing current flows generates opposing electrostatic fields to interact with each other.

5. An interactive electrostatic field high energy storage AC blocking capacitor as in claim 2 wherein;

at least plate is configured in such a way so that the current from one part of the said plate induces an electrostatic field into another part of the said plate generating an opposing electrostatic field is the means by which opposing electrostatic fields from one part of the said plate interact with opposing electrostatic fields form another part of the said plate.

6. An interactive electrostatic field high energy storage AC blocking capacitor as in claim 3 wherein:

the folded edges along the length of the closed continuous electrical are folded and being in opposition with each other is the means by which the opposing concentrated electrostatic fields to interact with each other and neutralize each other, thereby blocking an AC current.

7. An interactive electrostatic field high energy storage AC blocking capacitor as in claim 1, claim 2 or claim 3 wherein; the negative plate is configured in such a way to ensure its edges are remote from the edges of the charging plate, ensuring that all paths for any residual charge concentrations on the charging plate to the negative plate are eliminated, preventing dielectric breakdown at high charging voltage.

* * * * *